(12) United States Patent  
Nishio et al.

(10) Patent No.: US 10,487,949 B2  
(45) Date of Patent: Nov. 26, 2019

(54) COUPLING MEMBER

(71) Applicants: NITTO KOHKI CO., LTD., Tokyo (JP); TOYOTA JIDOSHA KABUSHIKI KAISHA, Toyota-shi, Aichi-ken (JP)

(72) Inventors: Takuya Nishio, Tokyo (JP); Hidetoshi Nohara, Tokyo (JP); Hirofumi Onishi, Toyota (JP)

(73) Assignees: NITTO KOHKI CO., LTD., Tokyo (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/995,825

(22) Filed: Jun. 1, 2018

(65) Prior Publication Data  
US 2018/0274684 A1 Sep. 27, 2018

Related U.S. Application Data

(63) Continuation of application No. PCT/JP2016/086320, filed on Dec. 7, 2016.

(30) Foreign Application Priority Data

Dec. 7, 2015 (JP) ................. 2015-238918

(51) Int. Cl.  
 F16K 1/32 (2006.01)  
 F16K 51/00 (2006.01)  
 F16L 37/40 (2006.01)

(52) U.S. Cl.  
 CPC ............. F16K 1/32 (2013.01); F16K 51/00 (2013.01); F16L 37/40 (2013.01)

(58) Field of Classification Search  
 CPC .......... F16K 1/32; F16K 15/063; F16K 51/00; F17C 1/00; F17C 2221/012; F17C 2205/037; F16L 37/44; F16L 37/40  
 (Continued)

(56) References Cited

U.S. PATENT DOCUMENTS 6,685,829 B1 2/2004 Baumann et al.  
7,094,344 B2 8/2006 Shirakawa et al.  
(Continued)

FOREIGN PATENT DOCUMENTS

EP 1118368 3/2006  
EP 1137470 2/2008  
(Continued)

OTHER PUBLICATIONS

International Search Report for International Application PCT/JP2016/086320, dated Feb. 21, 2017.

Primary Examiner — Madeline Gonzalez  
(74) Attorney, Agent, or Firm — Burris Law, PLLC

(57) ABSTRACT

A coupling member is provided that includes a filtration member provided in a fluid passage in a coupling body to divide the fluid passage into an upstream pre-filtration passage section and a downstream post-filtration passage section. The filtration member includes a cylindrical part extending in the direction of a longitudinal axis and having a filtration portion. The cylindrical part divides a downstream portion of the pre-filtration passage section and an upstream portion of the post-filtration passage section from each other in the radial direction of the cylindrical part. Further, the fluid passage has a dust collecting part extending in the direction of the longitudinal axis from the downstream portion to a position closer to a downstream opening than the filtration portion of the filtration member. The dust collecting part is closed at a downstream end thereof.

5 Claims, 2 Drawing Sheets

(58) Field of Classification Search
USPC .......... 210/459, 456, 167.02, 171, 439, 446
See application file for complete search history.

(56) References Cited

U.S. PATENT DOCUMENTS

| | | | |
|---|---|---|---|
| 7,785,516 | B2 | 8/2010 | Malkin |
| 7,967,980 | B2 | 6/2011 | Miyachi |
| 8,342,202 | B2 | 1/2013 | Nishio et al. |
| 8,419,937 | B2 | 4/2013 | Kuhnrich et al. |
| 2010/0108162 | A1* | 5/2010 | Nishio .................... F16L 37/23 137/614.03 |
| 2015/0034541 | A1 | 2/2015 | Cognetta et al. |
| 2016/0018013 | A1 | 1/2016 | Nishio et al. |
| 2016/0102771 | A1 | 4/2016 | Kuroyanagi et al. |
| 2016/0116918 | A1 | 4/2016 | Nakamura et al. |
| 2016/0131273 | A1 | 5/2016 | Onishi et al. |
| 2017/0218895 | A1 | 8/2017 | Girondi |

FOREIGN PATENT DOCUMENTS

| | | |
|---|---|---|
| EP | 1470080 | 12/2008 |
| EP | 2524730 | 9/2014 |
| EP | 3006791 | 4/2016 |
| JP | S552864 | 1/1980 |
| JP | 2000002393 | 1/2000 |
| JP | 2008232361 | 10/2008 |
| JP | 2011044293 | 3/2011 |
| JP | 2013223850 | 10/2013 |
| JP | 2014202254 | 10/2014 |
| JP | 2016075373 | 5/2016 |
| JP | 2016083643 | 5/2016 |
| JP | 2016084904 | 5/2016 |
| JP | 6116463 | 4/2017 |
| JP | 6219806 | 10/2017 |
| WO | 2001070369 | 9/2001 |

* cited by examiner

COUPLING MEMBER

CROSS-REFERENCE TO RELATED APPLICATIONS

This application is a continuation of International Application No. PCT/JP2016/086320, filed on Dec. 7, 2016, which claims priority to and the benefit of JP 2015-238918 filed on Dec. 7, 2015. The disclosures of the above applications are incorporated herein by reference.

FIELD

The present disclosure relates to a coupling member having a filtration member. More particularly, the present disclosure relates to a filtration member for trapping dust contained in fluid passing through the coupling member and through the filtration member.

BACKGROUND

The statements in this section merely provide background information related to the present disclosure and may not constitute prior art.

A fuel cell vehicle, for example, has a receptacle (male coupling member) attached to a fuel supply part of the vehicle body. The receptacle is couplable to a nozzle (female coupling member) provided at a hydrogen supply station supplying hydrogen used as a fuel. When hydrogen supply is not performed, the receptacle is closed at its upstream opening with a cap to prevent dust or other contaminants from entering the inside of the receptacle. When the nozzle at the hydrogen supply station is to be coupled to the receptacle, however, the cap is removed from the receptacle, and the upstream opening and the fluid passage are exposed to the outside air. Accordingly, dust or the like may enter the inside of the fluid passage. Also, some dust or the like may adhere to the nozzle at the hydrogen supply station. Further, hydrogen supplied from the hydrogen supply station per se may contain dust or the like. Therefore, such dust may be contained in hydrogen that is supplied from the hydrogen supply station through the coupling body (receptacle). Accordingly, the receptacle is conventionally provided with a filtration member to remove dust from hydrogen to be supplied into the vehicle body (Japanese Patent Application Publication No. 2014-202254).

In the above-described coupling member having a filtration member, dust gradually accumulates in the filtration medium of the filtration member as the coupling member is repeatedly used. Therefore, the filtration member becomes necessary to replace when the coupling member has been used a certain number of times. However, it is usually necessary, in order to replace the filtration member, to detach and disassemble the coupling member, which takes time and effort and is also costly because a new filtration member is needed.

SUMMARY

The present disclosure provides a coupling member configured to trap dust or other contaminants contained in a fluid before the fluid reaches a filtration member, thereby reducing the amount of dust or the like reaching the filtration medium of the filtration member.

The present disclosure provides a coupling member including the following elements: a coupling body defining an upstream opening configured to receive a fluid, a downstream opening configured to discharge the fluid received, and a fluid passage extending from the upstream opening to the downstream opening in the direction of a longitudinal axis; and a filtration member set in the fluid passage to divide the fluid passage into an upstream pre-filtration passage section and a downstream post-filtration passage section, the filtration member having a cylindrical part extending in the direction of the longitudinal axis and having a filtration portion, the cylindrical part dividing a downstream portion of the pre-filtration passage section and an upstream portion of the post-filtration passage section from each other in the radial direction of the cylindrical part, so that the fluid that has reached the downstream portion of the pre-filtration passage section passes through the filtration portion of the cylindrical part in the radial direction to flow into the upstream portion of the post-filtration passage section. The fluid passage includes a dust collecting part communicating with the downstream portion of the pre-filtration passage section and extending in the direction of the longitudinal axis from the downstream portion to a position closer to the downstream opening than the filtration portion of the filtration member, the dust collecting part being closed at a downstream end thereof.

In the coupling member, when the fluid supplied from the upstream opening passes through the filtration portion from the downstream portion of the pre-filtration passage section to reach the upstream portion of the post-filtration passage section, the direction of flow of the fluid changes from the direction of the longitudinal axis to the radial direction. At this time, dust contained in the fluid is forced by inertia to move through the downstream portion rectilinearly in the direction of the longitudinal axis. Consequently, dust particles having a relatively large mass are subjected to large inertia forces and forced to continue moving in the direction of the longitudinal axis without reaching the filtration portion despite being subjected to a force toward the filtration portion from the fluid that has changed its direction of flow, and these dust particles reach the dust collecting part, which is located past the downstream portion. That is, some of dust contained in the fluid passes by the filtration portion in the direction of the longitudinal axis and is trapped in the dust collecting part. Accordingly, the amount of dust reaching the filtration portion is reduced, and the filtration portion cannot easily be clogged. It is therefore possible to extend the replacement cycle of the filtration member.

In one form, the arrangement may be as follows. The filtration member includes an upstream closing portion closing an upstream end of the cylindrical part. The downstream portion of the pre-filtration passage section is a passage of annular cross-section located between the outer peripheral surface of the cylindrical part of the filtration member and the peripheral wall surface of the fluid passage, and the upstream portion of the post-filtration passage section is located inside the cylindrical part of the filtration member. The dust collecting part is an annular recess formed in the coupling body.

In another form, the dust collecting part may have an annular inlet portion communicating with the downstream portion of the pre-filtration passage section and having a narrow radial width, and an annular dust storing portion provided continuously with the inlet portion and having a wider radial width than that of the inlet portion.

Thus, the dust collecting part has a narrow-width inlet portion and a wide-width dust storing portion located past the inlet portion. Accordingly, it is possible to suppress dust once reaching the dust storing portion from flowing back out of the dust collecting part through the inlet portion, and the dust can be kept trapped in the dust collecting part.

In a further form, the arrangement may be as follows. The coupling body includes a cylindrical first body member having the upstream opening and a filtration member accommodating space communicating with the upstream opening, and a second body member disposed as least partially in the filtration member accommodating space in the first body member to support and set the filtration member in the filtration member accommodating space. The dust collecting part is formed between the peripheral wall surface of the filtration member accommodating space in the first body member and the outer peripheral surface of the second body member.

Alternatively, the arrangement may be as follows. The filtration member includes an inlet opening portion opened at the upstream end of the cylindrical part to communicate with the upstream opening, and a downstream closing portion closing the downstream end of the cylindrical part. The downstream portion of the pre-filtration passage section is located inside the cylindrical part of the filtration member, and the upstream portion of the post-filtration passage section is located outside the cylindrical part of the filtration member. The dust collecting part communicates with the downstream portion inside the cylindrical part and is formed in the downstream closing portion at a position closer to the downstream opening than the filtration portion.

Various forms of the coupling member according to the present disclosure will be explained below based on the accompanying drawings.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
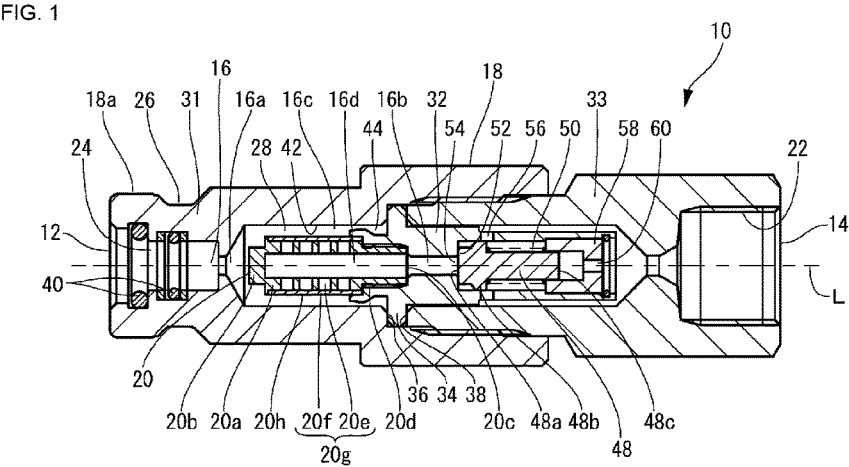
FIG. 1 is a sectional view of a coupling member according to a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a coupling member 10 according to a first form of the present disclosure includes a cylindrical coupling body 18 having a fluid passage 16 extending from an upstream opening 12 to a downstream opening 14 in a direction of a longitudinal axis L. The coupling member 10 further includes a filtration member 20 set in the fluid passage 16. The coupling member 10 is a receptacle (male coupling member) attached to a fuel cell vehicle and used as a hydrogen supply port. The coupling member 10 has a pipe connecting portion 22 formed in the downstream opening 14. The pipe connecting portion 22 is connected with a hydrogen pipe extending from a hydrogen tank disposed in the vehicle body.

Figure 2:
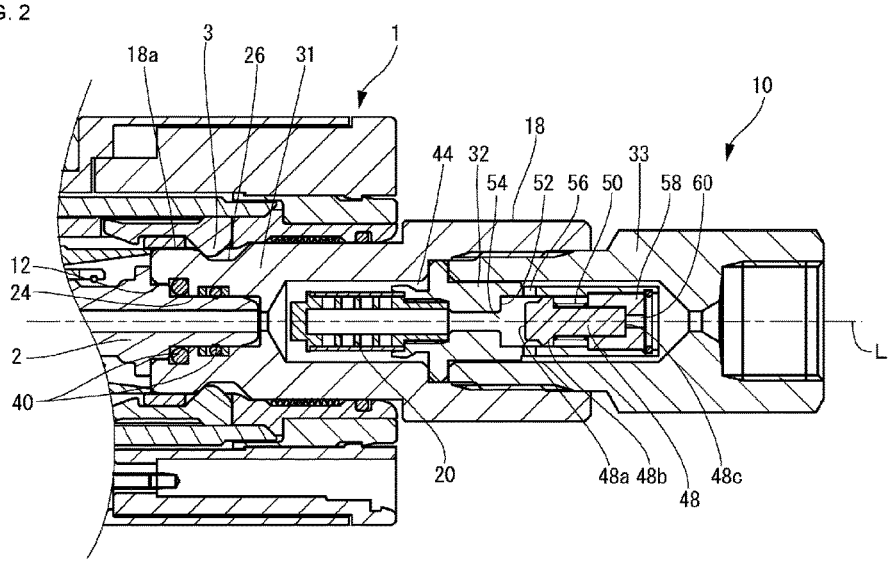
FIG. 2 is an illustration of the coupling member of FIG. 1 coupled to a nozzle at a hydrogen supply station to receive hydrogen.

As shown in FIG. 2, the upstream opening 12 is configured to fit with a nozzle (female coupling member) 1 provided at the distal end of a hydrogen supply hose at a hydrogen supply station. That is, a nozzle distal end 2 of the nozzle 1 is inserted into a nozzle insertion port 24 in the upstream opening 12, and a locking element 3 of the nozzle 1 is engaged with a locking element engaging groove 26 formed in an outer peripheral surface 18a of the coupling body 18. Thus, the coupling member 10 is coupled to the nozzle 1.

The coupling body 18 comprises a cylindrical first body member 31, a second body member 32, and a third body member 33. The first body member 31 includes an upstream opening 12, a nozzle insertion port 24, and a filtration member accommodating space 28 communicating with the upstream opening 12. The second body member 32 is partially disposed in the filtration member accommodating space 28 to support and set the filtration member 20 in the filtration member accommodating space 28. The third body member 33 includes the downstream opening 14 and is threadedly engaged with the first body member 31. The second body member 32 includes a clamping flange portion 34 projecting radially outward. The clamping flange portion 34 is clamped between a locking surface 36 of the first body member 31 and a locking surface 38 of the third body member 33, thereby allowing the second body member 32 to be locked to the first and third body members 31 and 33. It should be noted that the nozzle insertion port 24 is fitted with a plurality of seal rings 40 disposed to sealingly engage the outer peripheral surface of the nozzle distal end 2 of the nozzle 1.

The filtration member 20 is a cylindrical member having a cylindrical part 20a extending in the direction of the longitudinal axis L, an upstream closing portion 20b closing the upstream end of the cylindrical part 20a, and an outlet opening portion 20c at the downstream end of the filtration member 20. The filtration member 20 is detachably attached to the second body member 32 by threaded engagement of an externally threaded portion 20d at the downstream end thereof with the second body member 32. The cylindrical part 20a is provided with a filtration portion 20g comprising a plurality of radially extending filtration holes 20e and a circular cylindrical filtration sheet 20f covering the filtration holes 20e from radially outside. The filtration member 20 divides the fluid passage 16 in the coupling body 18 into an upstream pre-filtration passage section 16a and a downstream post-filtration passage section 16b. Further, a downstream portion 16c of the pre-filtration passage section 16a and an upstream portion 16d of the post-filtration passage section 16b are divided from each other in the radial direction. The downstream portion 16c of the pre-filtration passage section 16a constitutes a passage of annular cross-section formed between the outer peripheral surface 20h of the cylindrical part 20a of the filtration member 20 and the peripheral wall surface 42 of the fluid passage 16, and the upstream portion 16d of the post-filtration passage section 16b constitutes a flow path located inside the cylindrical part 20a of the filtration member 20. Thus, the downstream portion 16c of the pre-filtration passage section 16a and the upstream portion 16*d* of the post-filtration passage section 16*b* are radially communicated with each other through the filtration portion 20*g* of the cylindrical part 20*a*. Accordingly, the fluid received from the upstream opening 12 flows through the downstream portion 16*c* of the pre-filtration passage section 16*a* in the direction of the longitudinal axis L and changes its direction to radially inward at a halfway position of the downstream portion 16*c* to pass through the filtration portion 20*g* in the radial direction. Thus, the fluid reaches the upstream portion 16*d* of the post-filtration passage section 16*b* and flows in the direction of the longitudinal axis L to reach the downstream opening 14. Dust contained in the fluid passing through the filtration portion 20*g* is trapped in the filtration sheet 20*f* when the fluid passes through the filtration portion 20*g* and thus removed. It should be noted that, in this form, the filtration sheet 20*f* comprises a member formed by weaving a metal wire into a sheet shape. However, the filtration sheet 20*f* may be formed from other filtration materials, e.g. a porous material.

Figure 3:
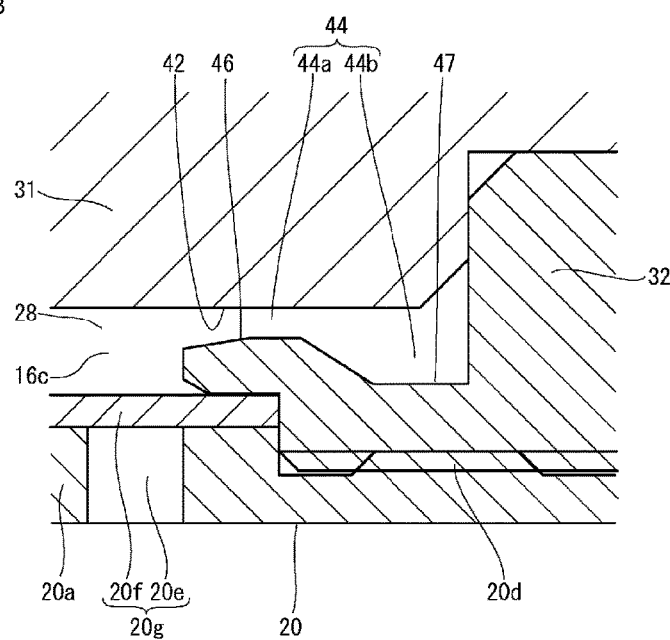
FIG. 3 is an enlarged view of a dust collecting part of a coupling member according to the present disclosure.

As shown in FIG. 3, the pre-filtration passage section 16*a* includes a dust collecting part 44 provided at an end downstream of the downstream portion 16*c*. The dust collecting part 44 is an annular recess formed between the peripheral wall surface 42 of the filtration member accommodating space 28 in the first body member 31 and the outer peripheral surface 46 of the second body member 32. The dust collecting part 44 includes an annular inlet portion 44*a* having a narrow radial width and communicating with the downstream portion 16*c* of the pre-filtration passage section 16*a*, and an annular dust storing portion 44*b* provided continuously with the inlet portion 44*a* and having a wider radial width than that of the inlet portion 44*a*. The dust collecting part 44 is configured to trap dust contained in the fluid, as will be described later. In the coupling member 10, the wide-width dust storing portion 44*b* is formed by forming an annular groove 47 in the outer peripheral surface 46 of the second body member 32. However, the dust storing portion 44*b* may be formed by forming a groove in the peripheral wall surface 42 of the first coupling body 18, for example.

As shown in FIG. 1, the second body member 32 of the coupling body 18 is further provided with a check valve 48. The check valve 48 is held displaceably in the direction of the longitudinal axis L and urged toward the upstream side (leftward as seen in the figure) by a spring 50 so that a forward end closing surface 48*a* of the check valve 48 is pressed against a valve seat surface 52 of the second body member 32. When the forward end closing surface 48*a* is pressed against the valve seat surface 52 to close an intermediate opening 54 of the fluid passage 16, as shown in FIG. 1, the fluid passage 16 is closed. As shown in FIG. 2, when the coupling member 10 is coupled to the nozzle 1 at a hydrogen supply station, hydrogen is supplied into the coupling member 10, and when a pressure higher than a predetermined level is applied to the upstream side of the coupling member 10, the check valve 48 is displaced toward the downstream side (rightward as seen in the figure) against the urging force of the spring 50. The second body member 32 includes a plurality of lateral openings 56 formed to open in the radial direction. When a lateral closing portion 48*b* of the check valve 48 is displaced toward the downstream side beyond the lateral openings 56, the intermediate opening 54 and the lateral openings 56 are communicated with each other, and the fluid passage 16 communicates between the upstream opening 12 and the downstream opening 14. Thus, the fluid received from the upstream opening 12 is allowed to flow to the downstream opening 14. The second body member 32 further includes a back-pressure opening 60 formed in a downstream end portion 58. Through the back-pressure opening 60, the pressure at the downstream opening 14 is applied to a rear end surface 48*c* of the check valve 48. Consequently, when the pressure at the downstream opening 14 is higher than the pressure at the upstream opening 12, the check valve 48 is pressed by pressing force generated by the differential pressure between the upstream opening 12 and the downstream opening 14 in addition to the urging force of the spring 50 to close the intermediate opening 54, thereby inhibiting back-flow from the downstream opening 14 toward the upstream opening 12.

In the coupling member 10, when dust is contained in the fluid supplied from the upstream opening 12, the dust moves through the pre-filtration passage section 16*a*, together with the fluid, and reaches the annular downstream portion 16*c*, which extends in the direction of the longitudinal axis L. In the downstream portion 16*c*, the fluid changes its direction of flow to radially inward to pass radially through the filtration portion 20*g* of the filtration member 20 in the radial direction and thereafter reaches the post-filtration passage section 16*b*. Meanwhile, dust contained in the fluid is acted upon by inertia, so that the dust is forced to continue moving rectilinearly through the downstream portion 16*c* toward the downstream opening 14 (rightward as seen in the figure) in the direction of the longitudinal axis L. Relatively large dust particles are subjected to large inertia forces and thus pass through the downstream portion 16*c* in the direction of the longitudinal axis L despite being subjected to a force directed toward the filtration portion 20*g* from the fluid which has changed its direction of flow, and the dust particles reach and are trapped in the dust collecting part 44. The dust collecting part 44 comprises the narrow-width inlet portion 44*a* and the wide-width dust storing portion 44*b*, as described above. Accordingly, once reaching the dust storing portion 44*b*, dust cannot easily return to the downstream portion 16*c* through the narrow-width inlet portion 44*a*.

Figure 4:
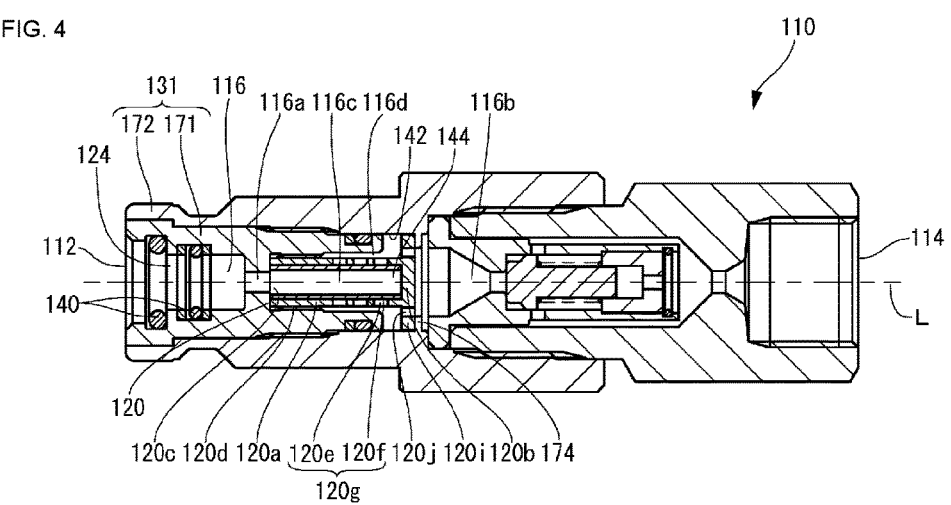
FIG. 4 is a sectional view of a coupling member according to a second form of the present disclosure.

As shown in FIG. 4, a coupling member 110 according to a second form of the present disclosure includes a first body member 131 comprising an inner member 171 and an outer member 172. The inner member 171 is coaxially disposed inside the outer member 172 and threadedly engaged with the outer member 172 so that the inner member 171 is attachable to and detachable from the upstream side (left side as seen in the figure). The coupling member 110 further includes a filtration member 120 having an inlet opening portion 120*c* opened at the upstream end of a cylindrical part 120*a* to communicate with an upstream opening 112. The filtration member 120 further includes a downstream closing portion 120*b* closing the downstream end of the cylindrical part 120*a*, and a filtration sheet 120*f* disposed to cover, from inside, filtration holes 120*e* formed in the cylindrical part 120*a*. The filtration member 120 is detachably secured to the first body member 131 by being threadedly engaged with the inner member 171 of the first body member 131 through an externally threaded portion 120*d* at the upstream end thereof. The filtration member 120 divides a fluid passage 116 into a pre-filtration passage section 116*a* and a post-filtration passage section 116*b*. A downstream portion 116*c* of the pre-filtration passage section 116*a* is located inside the cylindrical part 120*a* of the filtration member 120, and an upstream portion 116*d* of the post-filtration passage section 116*b* constitutes an annular flow path located outside the cylindrical part 120*a* of the filtration member 120. A dust collecting part 144 is formed as a recess formed in the downstream closing portion 120*b* at a position closer to the downstream opening 114 than the filtration portion 120*g* to communicate with the downstream portion 116c inside the cylindrical part 120a. The filtration member 120 further includes a flange portion 120i projecting radially outward from the cylindrical part 120a. The flange portion 120i faces, in the direction of the longitudinal axis L, a retaining portion 174 extending radially inward from the peripheral wall surface 142 of the outer member 172 to suppress displacement of the filtration member 120 toward the downstream opening 114. For example, when high-pressure hydrogen passes through the coupling member 110, the filtration member 120 is subjected to a great force in a direction toward the downstream opening 114 in the direction of the longitudinal axis L. Therefore, as the coupling member 110 is repeatedly used, the threaded engagement between the filtration member 120 and the inner member 171 at the externally threaded portion 120d may loosen, and the filtration member 120 may move toward the downstream side. In this regard, even if the threaded engagement loosens, the flange portion 120i abuts against the retaining portion 174 of the outer member 172; therefore, the filtration member 120 cannot be further displaced toward the downstream side. It should be noted that the flange portion 120i is provided with a plurality of through-holes 120j extending therethrough in the direction of the longitudinal axis L at a position radially inward of the retaining portion 174, so that the fluid flows through the through-holes 120j.

In the coupling member 110, the fluid supplied from the upstream opening 112 passes through the pre-filtration passage section 116a in the direction of the longitudinal axis L and reaches the downstream portion 116c of the pre-filtration passage section 116a, which is formed inside the filtration member 120. In the downstream portion 116c, the fluid changes its direction of flow to radially outward and passes through the filtration portion 120g of the filtration member 120 to reach the upstream portion 116d of the post-filtration passage section 116b. At this time, if dust is contained in the fluid, the dust moves through the pre-filtration passage section 116a in the direction of the longitudinal axis L, being carried by the flow of fluid, and is forced by inertia to continue moving rectilinearly in the direction of the longitudinal axis L. Relatively large dust particles are subjected to large inertia forces and thus pass through the downstream portion 116c in the direction of the longitudinal axis L to reach the dust collecting part 144. In the dust collecting part 144, the dust particles collide with the downstream closing portion 120b, which constitutes the dust collecting part 144, and are trapped in the dust collecting part 144.

The coupling member 110 is configured to enable the filtration member 120 to be detached together with the inner member 171 by detaching the inner member 171 from the outer member 172. Thus, the filtration member 120 can be detached without detaching the whole coupling member 110 from the vehicle body or the like. Therefore, the filtration member 120 can be easily cleaned and replaced. Further, it is beneficial to replace the seal rings 140 disposed in a nozzle insertion port 124 due to wear or damage caused by repeated attaching and detaching of the nozzle 1. In this regard, the replacement of the seal rings 140 can also be easily performed because the seal rings 140 are also detached together with the inner member 171.

In the coupling member 10/110 according to the foregoing forms, a particle of dust contained in the fluid is trapped not in the filtration member 20/120 but in the dust collecting part 44/144; therefore, the amount of dust trapped in the filtration member 20/120 is reduced correspondingly. Accordingly, the length of time taken until the filtration member 20/120 is clogged with dust increases, and it becomes possible to extend the replacement cycle of the filtration member 20/120 as compared to the conventional coupling member.

The coupling member 10/110 according to the foregoing forms is used in association with the hydrogen supply part of a fuel cell vehicle, as described above. Hydrogen from a hydrogen supply station is usually supplied at an ultra-high pressure of 70 MPa; therefore, hydrogen passing through the coupling member 10/100 is accelerated to about the speed of sound. Consequently, even dust particles as small as several micrometers reach the dust collecting part 44/144 by inertia, and an increased amount of dust can be collected in the dust collecting part 44/144. The coupling member 10/110 is particularly effective when the flow velocity of the fluid passing through the fluid passage 16/116 is high.

Although in the foregoing forms the coupling member according to the present disclosure have been described as a receptacle for supplying hydrogen into a fuel cell vehicle, it should be noted that the coupling member may also be constructed as a coupling member for other use applications, as a matter of course. Further, the coupling member may be constructed not as a male coupling member but as a female coupling member.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A coupling member comprising:
   a coupling body defining an upstream opening configured to receive a fluid, a downstream opening configured to discharge the fluid received, and a fluid passage extending from the upstream opening to the downstream opening parallel to a longitudinal axis; and
   a filtration member disposed in the fluid passage to divide the fluid passage into an upstream pre-filtration passage section and a downstream post-filtration passage section, wherein:
   the filtration member comprises a cylindrical part extending parallel to the longitudinal axis such that the fluid passing through a downstream portion of the upstream pre-filtration passage section radially passes through a filtration portion of the cylindrical part to flow into an upstream portion of the downstream post-filtration passage section,
   the fluid passage of the coupling body includes a dust collecting part in communication with the downstream portion of the upstream pre-filtration passage section, the dust collecting part extending parallel to the longitudinal axis from the downstream portion of the upstream pre-filtration passage section toward the downstream opening, wherein the dust collecting part is closed at a downstream end thereof,
   the filtration member further comprises an upstream closing portion closing an upstream end of the cylindrical part,
   the downstream portion of the upstream pre-filtration passage section defines an annular cross-section located between an outer peripheral surface of the cylindrical part of the filtration member and a peripheral wall surface of the fluid passage of the coupling body,
   the upstream portion of the downstream post-filtration passage section is located inside the cylindrical part of the filtration member, and the dust collecting part comprises an annular inlet portion having a radial width and in communication with the downstream portion of the upstream pre-filtration passage section, and an annular dust storing portion disposed continuously with the annular inlet portion, wherein a radial width of the annular dust storing portion is greater than that of the annular inlet portion.

2. The coupling member of claim 1, wherein:
the dust collecting part is an annular recess formed in the coupling body.

3. The coupling member of claim 1, wherein the coupling body further comprises:
a cylindrical first body member defining the upstream opening and a filtration member accommodating space in communication with the upstream opening; and
a second body member disposed at least partially in the filtration member accommodating space of the cylindrical first body member to support and set the filtration member in the filtration member accommodating space,
wherein the dust collecting part is formed between a peripheral wall surface of the filtration member accommodating space of the cylindrical first body member and an outer peripheral surface of the second body member.

4. A coupling member comprising:
a coupling body defining an upstream opening configured to receive a fluid, a downstream opening configured to discharge the fluid received, and a fluid passage extending from the upstream opening to the downstream opening parallel to a longitudinal axis; and
a filtration member disposed in the fluid passage to divide the fluid passage into an upstream pre-filtration passage section and a downstream post-filtration passage section, wherein:
the filtration member comprises a cylindrical part extending parallel to the longitudinal axis such that the fluid passing through a downstream portion of the upstream pre-filtration passage section radially passes through a filtration portion of the cylindrical part to flow into an upstream portion of the downstream post-filtration passage section,
the fluid passage of the coupling body includes a dust collecting part in communication with the downstream portion of the upstream pre-filtration passage section, the dust collecting part extending parallel to the longitudinal axis from the downstream portion of the upstream pre-filtration passage section toward the downstream opening, wherein the dust collecting part is closed at a downstream end thereof,
the filtration member further comprises an inlet opening portion opened at an upstream end of the cylindrical part to communicate with the upstream opening, and a downstream closing portion closing a downstream end of the cylindrical part,
the downstream portion of the upstream pre-filtration passage section is located inside the cylindrical part of the filtration member, and the upstream portion of the downstream post-filtration passage section is located outside the cylindrical part of the filtration member, and
the dust collecting part extends inside the cylindrical part from the downstream portion of the upstream pre-filtration passage section to the downstream closing portion.

5. The coupling member of claim 1, wherein the radial width of the annular inlet portion is less than that of the upstream portion of the downstream post-filtration passage section.

* * * * *